United States Patent [19]

Booth

[11] Patent Number: 5,555,445
[45] Date of Patent: Sep. 10, 1996

[54] METHOD OF INTRA-CELL AND INTER-CELL HANDOVER IN A MOBILE COMMUNICATIONS SYSTEM

[75] Inventor: Andrew J. Booth, Bishop's Stortford, United Kingdom

[73] Assignee: Northern Telecom Limited, Montreal, Canada

[21] Appl. No.: 275,494

[22] Filed: Jul. 15, 1994

[30]     Foreign Application Priority Data

Jul. 22, 1993 [GB]  United Kingdom ............... 9315218

[51] Int. Cl.⁶ ........................... H04B 7/26; H04Q 7/22
[52] U.S. Cl. ................. 455/33.2; 455/34.1; 455/56.1; 379/60
[58] Field of Search ................ 379/60, 63; 455/33.1, 455/33.2, 33.4, 34.1, 34.2, 53.1, 54.1, 54.2, 56.1, 57.1, 62, 67.1, 63

[56]                References Cited

U.S. PATENT DOCUMENTS 5,293,643  3/1994  Israelsson .................. 455/33.2
5,329,635  7/1994  Wadin et al. ............... 455/33.2
5,369,786  11/1994 Hulsebosch ................. 455/56.1
5,392,331  2/1995  Patsiokas et al. ........... 455/33.2

*Primary Examiner*—Chi H. Pham
*Attorney, Agent, or Firm*—Lee, Mann, Smith, McWilliams, Sweeney & Ohlson

[57]               ABSTRACT

A method of performing handover of a call associated with a mobile station in one cell but moving towards another cell includes making a first attempt, using for example a MUX1 SNIFF procedure, on the channel allocated to the mobile station for that call. If that attempt fails, the mobile station is allocated a different channel in the one cell and makes a second attempt. This different channel allocation (intracell handover) is performed even if there are no better signal characteristics achieved as a result. This procedure makes it more likely to be possible to achieve handover when a second mobile station associated with an adjacent cell and operating on the same channel as the first mobile station is also within range of the base station of the other cell.

5 Claims, 1 Drawing Sheet

METHOD OF INTRA-CELL AND INTER-CELL HANDOVER IN A MOBILE COMMUNICATIONS SYSTEM

This invention relates to mobile communications and in particular to cellular systems and handover between cells of such systems.

BACKGROUND OF THE INVENTION

Personal communication systems (PCS), which include those based on CT-2, have handover between cells which is controlled by the system itself. When a handover is required in CT-2 based systems due to a mobile station (portable) being close to leaving a particular cell, the surrounding cells (cell neighbours)are instructed to perform a MUX1 SNIFF procedure. All of these cells which have a free radio will tune to the portable's channel and try to decode the PID (portable identity). If the PID can be detected, the base stations detecting it will measure the RSSI (Received Signal Strength Indication) and report this information to the system controller. The portable is then handed over to the first base station to respond which had an adequate RSSI.

SUMMARY OF THE INVENTION

According to the present invention there is provided a method for use in a cellular mobile communications system for performing handover, from a first base station to a second base station, of a call associated with a mobile station moving between adjacent cells corresponding to said base stations, comprising the steps of making a first attempt to achieve handover on the channel allocated to the mobile station for that call, and if that attempt fails, allocating the mobile station an alternative channel in the cell associated with the first base station and making a second attempt on the alternative channel.

The method has the advantage of reducing the risk of dropping a call during handover.

BRIEF DESCRIPTION OF THE DRAWINGS

Embodiments of the invention will now be described with reference to the accompanying drawings, in which.

DESCRIPTION OF THE PREFERRED EMBODIMENT

Figure 1:
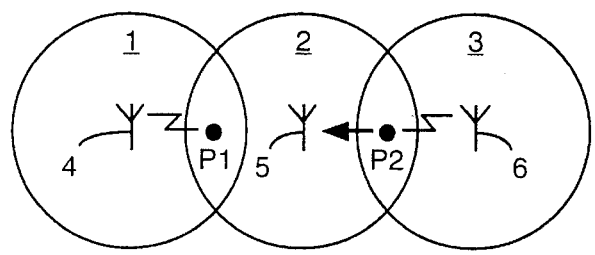
FIG. 1 illustrates a handover situation when a SNIFF instruction may fall.

Referring firstly to FIG. 1, there is a potential problem with the conventional MUX1 SNIFF handover procedure. Three cells, 1, 2 and 3 have respective base stations 4, 5 and 6. There is a portable P2 with a call established in cell 3. It is however moving into cell 2. Another portable P1 is in cell 1 where it overlaps with cell 2 and has an established call. The portables P1 and P2 are on the same RF channel. This is possible and very likely since cells 1 and 3 are not adjacent. In this case the MUX1 SNIFF instruction is likely to fail since the two portables are equidistant from base station 5 and are using the same channel. If base station 5 cannot decode the PID (portable identity), portable P2 cannot handover to cell 2 (base station 5) and the call will probably be dropped.

In order to enable at least some of the handovers which would normally fail in those circumstances to be achieved, it is proposed that the following procedure is carried out. As before, base station 6 will instruct all of the surrounding cells base stations (candidate base stations), including base station 5, to try to detect portable P2, when its signal level falls below a specified level, by means of a MUX1 SNIFF. If none of the base stations detects the portable P2, the portable P2 is handed over to another channel in the same cell (cell 3). This is intra-cell handover. This handover is to take place even if the signal is no better on the new channel. The candidate base stations are then instructed again to try to detect portable P2, which is now on a different channel to P1. There might be another portable in cell 1 on the same channel as P2 now is, but it may not be in the overlap area and equidistant from base station 4 with the result that P2 may be detectable. If upon the second MUX1 SNIFF base station 5 detects the portable P2, the portable P2 can be handed over from base station 6 to base station 5 (cell 2). If the second MUX1 SNIFF fails the intracell handover may be carried out again, followed by a third MUX1 SNIFF. If there is no spare frequency channel in cell 3 either before or after any intracell handover, then it will not be possible to perform an intracell handover and the call will be dropped. Typically when spare channels are available the intracell handover can be performed two or may three times before the call is dropped.

Figure 2:
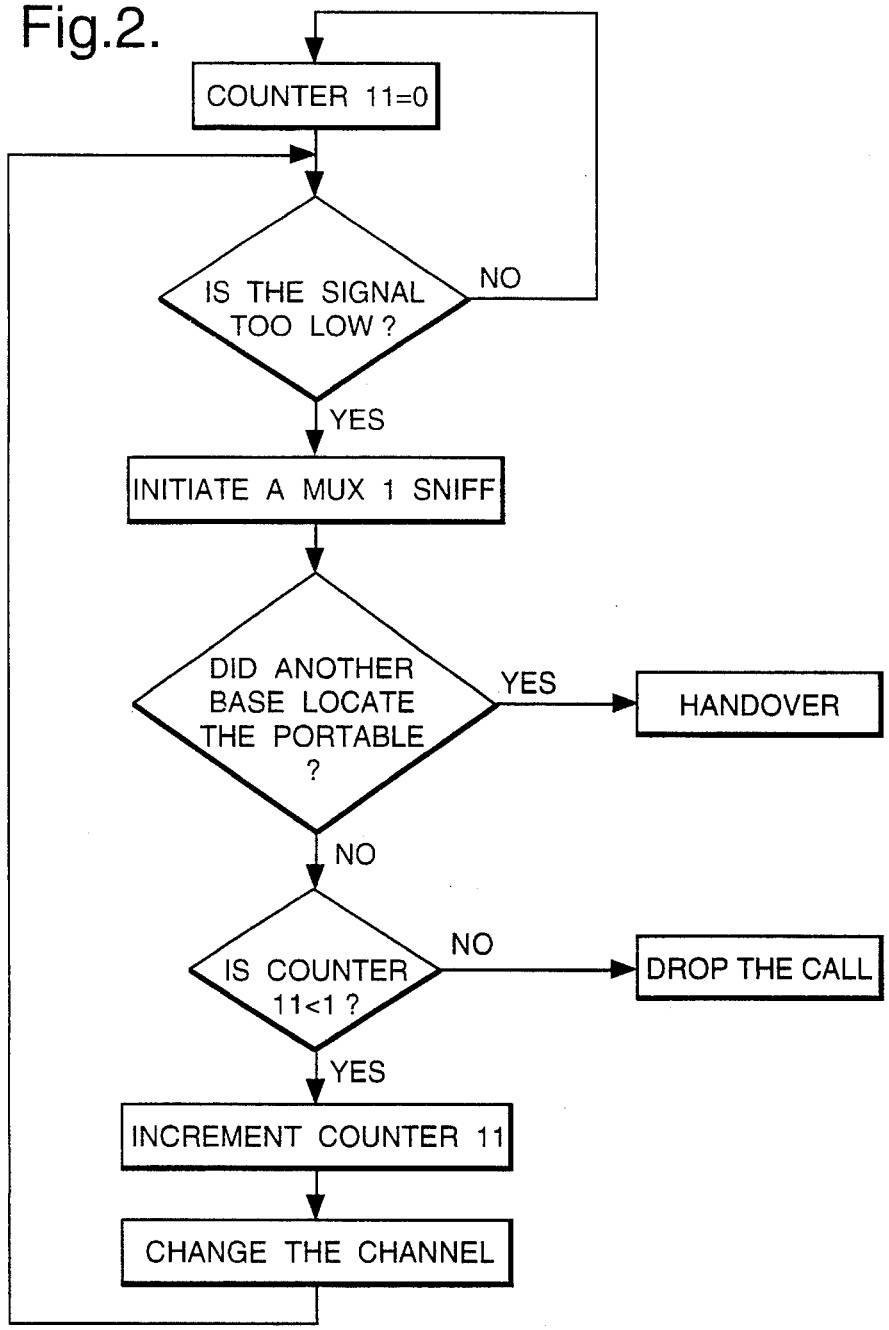
FIG. 2 is a handover algorithm for use in the situation of FIG. 1.

A handover algorithm for the intracell handover prior to intercell handover situation is illustrated in FIG. 2. This algorithm allows two intracell handovers before dropping a call but this is not the only possibility.

The signal strength for a portable is continuously monitored by the current base station. If the signal is acceptable, a counter (counter 11) is set to zero. If the signal is too low, a MUX1 SNIFF is initiated. If another base station locates the portable, handover is performed. If it does not, the counter is checked to see that its value is less than 1. If it is greater than 1 the call is dropped. If it is less than 1 the counter is incremented by 1 and the portable's channel is changed and the procedure repeated. If the signal is still too low a further MUXI SNIFF is initiated and handover can be performed in the event that another base locates the portable. If it does not the call will be dropped as the counter is already at 1. Hence two attempts to achieve intercell handover are made before the call was dropped, rather than one as in the conventional procedure, with the second attempt being on a different channel in view of the intracell handover that has occurred. If more than two attempts are required the counter threshold can be set at higher than 1, 2 for example. Intracell handover per se is known and was used previously in order for a mobile station to be operating on the channel with the best characteristics, signal strength, lack of interference etc. In the present application intra-cell handover is forced when handover cannot be achieved on the existing channel, even if the signal on the new channel is no better than the existing channel, in order to improve the chances of achieving call handover. More than one attempt at handover is made before a call is dropped, the attempts being on different channels.

I claim:

1. A method for use in a cellular mobile communications system for performing handover, from a first base station to a second base station, of a call associated with a mobile station moving between adjacent cells corresponding to said base stations, said mobile station being in communication with the first base station via a first communications channel associated with that base station, the method comprising the steps of;

monitoring from the first base station the signal level of the mobile station so as to determine when that signal level falls below a predetermined value;

responsive to said determination attempting to detect the mobile station from said second base station;

effecting intercell handover of the mobile station to the second base station when said detection attempt is successful; when said detection attempt is unsuccessful;

effecting intrahandover of the mobile station from said first channel to a further channel of the first base station and repeating said monitoring and detection attempting steps; and effecting intercell handover to said second base station if said repeated detection attempt is successful.

2. A method as claimed in claim 1, wherein for intercell handover the first base station instructs all surrounding base stations to try to detect the mobile station and handover is performed to a base station which detects the mobile station.

3. A method as claimed in claim 2, wherein the surrounding base stations are instructed to perform a MUX1 SNIFF comprising tuning to the first channel allocated to the mobile station for the call, trying to decode the identity of the mobile station, and in the event of decoding the identity measuring the received signal strength and reporting the measured signal strength to the first base station, the first base station handing over the call to the base station which responds first with an adequate received signal strength.

4. A method as claimed in claim 1, and including the step of dropping the call if the second detection attempt has failed.

5. A method as claimed claim 1 and including the step of making a further intracell handover of the mobile station to a third channel of the first base station if the second detection attempt has failed.

* * * * *